| United States Patent [19] | [11] Patent Number: 4,705,718 |
|---|---|
| Kitahata et al. | [45] Date of Patent: Nov. 10, 1987 |

[54] MAGNETIC RECORDING MEDIUM

[75] Inventors: Shinichi Kitahata; Mikio Kishimoto, both of Osaka, Japan

[73] Assignee: Hitachi Maxell, Ltd., Osaka, Japan

[21] Appl. No.: 802,386

[22] Filed: Nov. 27, 1985

[30] Foreign Application Priority Data

Nov. 30, 1984 [JP] Japan ............................ 59-254313

[51] Int. Cl.$^4$ ............................................... G11B 5/70
[52] U.S. Cl. .............................. 428/323; 252/62.51;
252/62.63; 427/128; 428/694; 428/900;
428/695
[58] Field of Search ............... 428/323, 694, 900, 695;
427/128; 252/62.51, 62.63

[56] References Cited

U.S. PATENT DOCUMENTS

| 4,442,159 | 4/1984 | Dezawa et al. | 428/212 |
|---|---|---|---|
| 4,511,617 | 4/1985 | Hideyama et al. | 428/694 |
| 4,565,726 | 1/1986 | Oguchi et al. | 428/900 |
| 4,606,971 | 8/1986 | Ido et al. | 428/694 |

*Primary Examiner*—Paul J. Thibodeau
*Attorney, Agent, or Firm*—Birch, Stewart, Kolasch & Birch

[57] ABSTRACT

A magnetic recording medium suitable for high density recording comprising a substrate and a magnetic layer wherein the magnetic layer comprises a binder resin and ferrite magnetic powder comprising hexagonal system plate particles having such magnetic anisotropy that a magnetic anisotropy constant $K_1$ corresponding to the vertical magnetic component and a magnetic anisotropy constant $K_2$ corresponding to the horizontal magnetic component, both derived from Fourier analysis of a magnetic torque curve measured in a plane including the C axis of the hexagonal system, satisfy following equations:

$$0.5 < K_1/K_2 < 5 \text{ and } K_1 > 0,$$

The magnetic recording medium is suitable for use in high density recording.

14 Claims, No Drawings

MAGNETIC RECORDING MEDIUM

FIELD OF THE INVENTION

The present invention relates to a magnetic recording medium. More particularly, it relates to a magnetic recording medium suitable for high density recording.

BACKGROUND OF THE INVENTION

Magnetic characteristics of the magnetic recording medium can be improved by, for example, orientating acicular particles of magnetic powder having magnetic anisotropy along the longest axis of the particle in the longitudinal or traveling direction of a magnetic layer. However, there is an upper limit of recording density in the magnetic recording medium having the magnetizing component in the longitudinal direction of the magnetic layer. That is, as the recording density of signals increases, the demagnetizing field in the magnetic recording medium increases and, in turn, decreases and a rotation of residual magnetization or remanence occurs so that it becomes difficult to read out the signals recorded in the magnetic recording medium.

Recently, a vertical magnetic recording system has been recognized as a suitable system for high density recording since in this system the influence of the demagnetizing field decreases as the recording density increases. For example, it is proposed to vertically record signals by using barium ferrite magnetic powder having a chemical comusing position of $BaO.6Fe_2O_3$ each particle of which is of a hexagonal plate shape and has magnetic anisotropy in a direction perpendicular to the plate plane, and orientating the particles parallel to the magnetic layer so as to make use of the magnetic component in the direction perpendicular to the plate plane.

However, with the magnetic recording medium using the above described barium ferrite, it is difficult to satisfactorily record or reproduce the signals. This may be because the barium ferrite has too large a coercive force to be used in the magnetic recording medium. In order to decrease only the coercive force without deteriorating saturation magnetization, it is proposed to add Co or Ti to the barium ferrite in the production step thereof so as to substitute a part of the iron elements with these elements. However, when iron elements are unadequately substituted, for example, unhomogeneously substituted, the direction of the magnetic easy axis of magnetization, which should be in the direction perpendicular to the plate plane, changes into a direction parallel to the plane, that is, the magnetic particle is converted into a so-called planer type ferrite magnetic powder. In the planer type ferrite magnetic powder, the vertical magnetic anisotropy is deteriorated so that the magnetic recording medium comprising such planer type ferrite magnetic powder has deteriorated characteristics, particularly reduced maximum output level (M.O.L.) in a range of shorter wavelength. In an extreme case, the vertical recording and reproducing cannot be carried out.

SUMMARY OF THE INVENTION

As a result of the extensive study, it has been found that the cause for such deterioration of vertical recording and reproducing characteristics of the conventional barium ferrite type magnetic recording medium may be attributed to the fact that the inherent strong vertical magnetic anisotropy of the barium ferrite magnetic powder is deteriorated by the presence of impurities in raw materials used for supplying the substituent elements such as Co and Ti to the barium ferrite magnetic powder, a nonuniform temperature gradient is used in the heating step or an unhomogeneous concentration distribution of the substituent elements is used in the reaction system.

To overcome the above defects of the conventional barium ferrite magnetic powder, there has been developed a novel ferrite magnetic powder which comprises hexagonal system plate particles having such magnetic anisotropy that a magnetic anisotropy constant $K_1$ corresponding to the vertical magnetic component and a magnetic anisotropy constant $K_2$ corresponding to the horizontal magnetic component, both derived from Fourier analysis of a magnetic torque curve measured in a plane including the C axis of the hexagonal system, satisfy following equations:

$$0.5 < K_1/K_2 < 5 \text{ and } K_1 > 0.$$

Such a novel ferrite magnetic powder has sufficient coercive force and magnetic easy axis of magnetization perpendicular to the plane of the particle of the powder which is suitable for vertical recording.

By utilizing the novel ferrite magnetic powder, the present invention provides a magnetic recording medium suitable for high density recording comprising a substrate and a magnetic layer wherein the magnetic layer comprises a binder resin and the novel ferrite magnetic powder described above.

DETAILED DESCRIPTION OF THE INVENTION

The magnetic anisotropy constants $K_1$ and $K_2$ are calculated by Fourier analysis of the magnetic torque curve measured in a plane including the C axis of the hexagonal system of the ferrite magnetic powder particles.

When the ratio of $K_1/K_2$ is not less than 5, namely $K_2$ is much smaller than $K_1$, recording and reproducing of the signals are not satisfactorily performed so that sufficient M.O.L. is not achieved although the magnetic easy axis of magnetization coincides with the C axis so that the high degree of vertical orientation in the magnetic layer is obtained. On the other hand, when the ratio of $K_1/K_2$ is not larger than 0.5, namely $K_1$ is much smaller than $K_2$, the magnetic easy axis of magnetization tends to orient in the plate plane so that the degree of vertical orientation in the magnetic layer and thus the vertical magnetic component decrease, this resulting in poor high density recording.

The novel ferrite magnetic powder of the invention that is used is at least 95 % by weight of the total weight of the magnetic powder contained in the magnetic layer. Any one of the conventionally used magnetic powders can be used in conjunction with this novel powder.

The ferrite magnetic powder comprising hexagonal system plate particles to be used according to the present invention may be barium ferrite represented by the formula:

$$BaO \cdot n(Fe_{1-x}M_x)_2O_3$$

wherein M is at least one element selected from the group consisting of Co, Ti, Ni, Mn, Cu, Zn, In, Ge and Nb, n is a value of 3 to 6, and x is a value of 0 to 0.5.

The hexagonal plate type barium ferrite magnetic powder may be produced by a method comprising adding aqueous solutions of a barium compound (e.g. barium chloride), of iron compound (e.g. iron chloride) and of at least one pure compound (e.g. chloride) of the elements Co, Ti, Ni, Mn, Cu, Zn, In, Ge and Nb in an aqueous solution of alkali (e.g. sodium hydroxide and potassium hydroxide) to precipitate the barium ferrite magnetic powder.

In this method, two conditions, namely a heating condition and an adding condition of the compound of the substituent element should be adequately controlled.

Firstly, after the powder precipitate is formed in the reaction system, the system is heated to a temperature of 150° to 200° C. at a rate of 2° to 10° C./min. with stirring. After kept standing for 10 to 60 minutes at the same temperature, it is heated to a temperature of 250° to 350° C. at a rate of 2° to 10° C./min. with stirring and then it is kept standing at the same temperature for 1 to 5 hours. The appearance of the magnetic anisotropy in the produced barium ferrite magnetic powder is greatly influenced by supply and interruption of thermal and/or kinetic energies for specific periods of time during the heating step. If the reaction system is heated to 250° to 350° C. in one step, it is difficult to produce a magnetic powder with $K_1$ of larger than 0 (zero). Alternatively, if the reaction system is heated in two steps with continuing stirring also in the period in which heating is interrupted, the magnetic powder tend to have a ratio of $K_1/K_2$ outside the above defined range, which is not suitable for the purpose of the present invention.

Secondly, the addition of the aqueous solution of the compound comprising the substituent element should be carefully carried out under such an atmosphere that any impurity element, namely any element other than Ba, Fe and the substituent elements of Co, Ti, Ni, Mn, Cu, Zn, In, Ge and Nb does not contaminate the magnetic powder precipitate. Surprisingly, it has been found that the presence of the impurity element influences the ratio of $K_1/K_2$ so as to deviate it from the above defined range.

The thus produced magnetic powder particles are washed, filtered, dried and then heated at a temperature of 400° to 1,000° C. for several hours to improve the magnetic characteristics.

Preferably, the barium ferrite magnetic powder has a particle size of 0.02 to 0.5 μm. When the particle size is less than 0.02 μm, the magnetic powder does not have sufficient magnetic characteristics. When it is larger than 0.5 μm, the surface of the magnetic layer is roughened so that high density recording is not achieved.

The barium ferrite magnetic powder to be used according to the present invention usually has coercive force of less than 2,000 oersted. However, if the coercive force is less than 200 oersted, it is difficult to achieve high density recording. Therefore, the magnetic powder preferably has coercive force of 200 to 2,000 oersted.

The magnetic recording medium may be of any shape, for example, a tape, a disc, a drum and the like and produced by a per se conventional method by utilizing the magnetic anisotropic magnetic powder with the specific anisotropic constants $K_1$ and $K_2$. For example, the magnetic powder is mixed and dispersed together with the binder resin in an organic solvent to prepare a magnetic coating composition and coated on a substrate made of, for example, polyester film by a suitable coating means such as a roll coater followed by drying.

The thickness of the magnetic layer is usually from 0.5 to 5 μm.

After or during the application of the magnetic layer on the substrate, preferably magnetic field is applied to the recording medium in the direction perpendicular to the magnetic layer so as to orientate the magnetic powder, by which the magnetic easy axis of magnetization is easily orientated and the surface smoothness of the magnetic layer is improved.

The binder resin may be any one of conventionally used ones. Their examples are a vinyl chloride/vinyl acetate copolymer, a polyvinyl butyral resin, a cellulose base resin, a polyurethane resin, an isocyanate compound, a radiation curable resin and the like.

Specific examples of the organic solvent are toluene, methyl ethyl ketone, cyclohexanone, tetrahydrofuran, ethyl acetate and the like and a mixture thereof.

The magnetic coating composition may optionally contain at least one of conventionally used additives, for example, a dispersing agent, a lubricant, an abrasion agent, an antistatic agent and so on.

The present invention will be hereinafter explained further in detail by following examples, wherein % and parts are by weight unless otherwise indicated.

EXAMPLE 1

Following components were dissolved in water (1,000 ml) and mixed with a 1 N aqueous solution of sodium hydroxide (1,000 ml) to precipitate magnetic powder:

| | |
|---|---|
| $BaCl_2.2H_2O$ | 27.9 g |
| $FeCl_3.6H_2O$ | 216 g |
| $CoCl_2.6H_2O$ | 10.6 g |
| $TiCl_4$ | 8.4 g |

The reaction mixture containing the powder precipitate was charged in an autoclave and heated to 170° C. at a rate of 5° C./min. with stirring. After stopping stirring. the mixture was kept standing for 30 minutes. Thereafter, the mixture was heated to 300° C. at a rate of 5° C./min. with stirring and then kept standing at the same temperature for 3 hours.

After washing with water, filtrating and drying, the produced magnetic powder was heated at 500° C. for 4 hours in the air to obtain the barium ferrite magnetic powder comprising plate shaped particles with coercive force of 1,200 oersted and saturation magnetization of 52 emu/g.

From the thus produced magnetic powder, a magnetic coating composition was prepared by mixing it with following components in a ball mill for 3 days:

| Component | Parts |
|---|---|
| Barium ferrite magnetic powder | 1,000 |
| Vinyl chloride/vinyl acetate/ vinyl alcohol terpolymer(*1) | 137.5 |
| Polyurethane resin(*2) | 87.5 |
| Low molecular weight trifunctional isocyanate compound(*3) | 25 |
| $Cr_2O_3$ powder | 15 |
| Lauric acid | 20 |
| Liquid paraffin | 2 |
| Methyl isobutyl ketone | 800 |

| Component | Parts |
|---|---|
| -continued | |
| Toluene | 800 |

Note
(*1)VAGH (trade name) manufactured by U.C.C. (U.S.A.)
(*2)Pandex T5201 (trade name) manufactured by Dainippon Ink.
(*3)Colonate L (trade name) manufactured by Nippon Polyurethane Industries.

The magnetic coating composition was coated on a polyester base film of 12 μm in thickness with applying a magnetic field of 3,000 oersted in a direction perpendicular to the film and dried to obtain the magnetic layer of 4 μm in thickness. After smoothening the surface of the magnetic layer, the film was cut to fabricate a magnetic recording tape having a predetermined width.

EXAMPLE 2

In the same manner as in Example 1 but using 13.8 g of $CoCl_2 \cdot 6H_2O$ and 11.0 g of $TiCl_4$, barium ferrite magnetic powder with coercive force of 850 oersted and saturation magnetization of 51 emu/g was produced, from which a magnetic tape was fabricated.

COMPARATIVE EXAMPLE 1

In the same manner as in Example 1, but heating the precipitated magnetic powder in the autoclave to 300° C. at a rate of 5° C./min. with stirring and then keeping it standing for 4 hours, the magnetic powder with coercive force of 860 oersted and saturation magnetization of 52 emu/g was produced, from which a magnetic recording tape was fabricated.

COMPARATIVE EXAMPLE 2

In the same manner as in Example 1, but heating the precipitated magnetic powder in the autoclave to 170° C. at a rate of 5° C./min. with stirring, keeping it at the same temperature with stirring for 30 minutes, heating it to 300° C. at a rate of 5° C./min. with stirring and then keeping it at the same temperature for 3 hours with stirring, magnetic recording powder with coercive force of 1,650 oersted and saturation magnetization of 52 emu/g, from which a magnetic recording tape was fabricated.

COMPARATIVE EXAMPLE 3

In the same manner as in Example 1, but heating the precipitated magnetic powder in the autoclave to 220° C. at a rate of 5° C./min. with stirring, keeping it at the same temperature without stirring for 30 minutes, heating it to 370° C. at a rate of 5° C./min. with stirring and then keeping it at the same temperature for 3 hours with stirring, magnetic recording powder with coercive force of 1,050 oersted and saturation magnetization of 51 emu/g, from which a magnetic recording tape was fabricated.

The coercive force in the direction perpendicular to the tape and squareness of the magnetic recording tapes produced in Examples and Comparative Examples and the maximum output level for each recording wavelength of 1, 0.75 and 0.5 μm were measured.

The magnetic torque curve of each magnetic powder was measured in the plane including the C axis of the particle crystal and subjected to the Fourier analysis to calculate the magnetic anisotropy constants $K_1$ and $K_2$. The results are shown in Table.

TABLE

| Example No. | Maximum output level (dB)(*1) | | | Positive or negative of $K_1$ | $K_1/K_2$ | Coercive force (Oe) | Squareness |
|---|---|---|---|---|---|---|---|
| | 1 μm | 0.75 μm | 0.5 μm | | | | |
| 1 | +2.0 | +3.3 | +4.1 | + | 2.5 | 1,250 | 0.82 |
| 2 | +1.5 | +1.8 | +2.5 | + | 1.0 | 1,050 | 0.84 |
| Comp. 1 | 0 | 0 | 0 | − | −2 | 920 | 0.62 |
| Comp. 2 | +0.5 | −1.6 | −3.5 | + | 7 | 2,050 | 0.84 |
| Comp. 3 | −0.5 | +0.5 | +2.0 | + | 0.1 | 1,200 | 0.82 |

Note
(*1)Difference from the maximum level of Comparative Example 1.

What is claimed is:

1. A magnetic recording medium suitable for high density recording comprising:
   a substrate and
   a magnetic layer which comprises (1) a binder resin and (2) ferrite magnetic powder dispersed in said binder resin comprising hexagonal system plate particles having a coercive force of 200 to 2,000 oersted, a size of 0.02 to 0.5 μm and such a magnetic anisotraophy that a magnetic anistrophy constant $K_1$, corresponding to the vertical magnetic component, and a magnetic anisotropy constant $K_2$, corresponding to the horizontal magnetic component, both being derived from Fourier analysis of a magnetic torque curve measured in a plane including the C axis of the hexagonal system, satisfy the following equations:

$$0.5 < K_1/K_2 < 5 \text{ and } K_1 > 0,$$

and wherein said hexagonal system plate particles constitute at least 95% by weight of the total weight of said magnetic powder in said magnetic layer.

2. A magnetic recording medium according to claim 1, wherein the magnetic powder having the magnetic anisotropy is a barium ferrite powder of the formula.

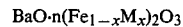
   $$BaO \cdot n(Fe_{1-x}M_x)_2O_3$$

wherein M is at least one element selected from the group consisting of Co, Ti, Ni, Mn, Cu, Zn, In, Ge and Nb, n is a value of from 3 to 6, and x is a value of from 0 to 0.5.

3. The magnetic recording medium according to claim 1, wherein the thickness of the magnetic layer is from 0.5 to 5 μm.

4. The magnetic recording medium according to claim 1, wherein the binder resin is selected from at least one member of the group consisting of a vinyl chloride/vinyl acetate copolymer, a polyvinyl butyral resin, a cellulose base resin, a polyurethane resin, an isocyanate compound, and a radiation curable resin.

5. The magnetic recording medium according to claim 2, wherein the hexagonal system plate particles have a coercive force of from 1,200 to 2,000 oersted and wherein the thickness of the magnetic layer is from 4 to 5 μm.

6. The magnetic recording medium according to claim 2, wherein the hexagonal system palte particles have a coercive force of from 850 to 2,000 oersted and wherein the thickness of the magnetic layer is from 4 to 5 μm.

7. The magnetic recording medium according to claim 2, wherein said medium is fabricated into a tape, a disc, or a drum.

8. The magnetic recording medium according to claim 2, wherein the substrate is a polyester film and wherein the binder resin and the ferrite magnetic powder are dispersed in an organic solvent before being coated on said substrate.

9. The magnetic recording medium according to claim 8, wherein the organic solvent is selected from at least one member of the group consisting of toluene, methyl ethyl ketone, cyclohexanone, tetrahyrofuran, ethyl acetate, and a mixture thereof.

10. The magnetic recording medium according to claim 1, wherein the magnetic layer additionally includes an additive selected from at least one member of the group consisting of a dispersing agent, a lubricant, an abrasion agent, and an antistatic agent.

11. A ferrite magnetic powder comprising hexagonal system plate particles having a coercive force of from 200 to 2,000 oersted, a size of 0.02 to 0.5 μm, and such a magnetic anisotropy that a magnetic anisotropy constant $K_1$, corresponding to the vertical magnetic component, and a magnetic anisotropy constant $K_2$, corresponding to the horizontal magnetic component, both being derived from Fourier analysis of a magnetic torque curve measured in a plane including the C axis of the hexagonal system, satisfy the following equations:

$$0.5 < K_1/K_2 < 5 \text{ and } K_1 < 0.$$

12. The ferrite magnetic powder according to claim 11, wherein said powder is barium ferrite powder of the formula:

$$B_2O \cdot n(Fe_{1-x}M_x)_2O_3$$

wherein M is at least one element selected from the group consisting of Co, Ti, Ni, Mn, Cu, Zn, In, Ge and Nb, n is a value of from 3 to 6, and x is a value of from 0 to 0.5.

13. The ferrite magnetic powder according to claim 12, wherein the hexagonal system plate particles have a coercive force of from 1,200 to 2,000 oersted.

14. The ferrite magnetic powder according to claim 12, wherein the hexagonal system plate particles have a coercive force of from 850 to 2,000 oersted.

* * * * *